United States Patent
Hudon et al.

(10) Patent No.: US 12,462,191 B2
(45) Date of Patent: Nov. 4, 2025

(54) IMAGE PROCESSING METHODS AND SYSTEMS FOR TRAINING A MACHINE LEARNING MODEL TO PREDICT ILLUMINATION CONDITIONS FOR DIFFERENT POSITIONS RELATIVE TO A SCENE

(71) Applicant: 7 SENSING SOFTWARE, Paris (FR)

(72) Inventors: Matis Hudon, Charenton le Pont (FR); Guillaume Cortes, Villeurbanne (FR); Toon Van Den Zegel, Goetsenhoven (BE)

(73) Assignee: 7 SENSING SOFTWARE, Paris (FR)

( * ) Notice: Subject to any disclaimer, the term of this patent is extended or adjusted under 35 U.S.C. 154(b) by 977 days.

(21) Appl. No.: 17/568,386

(22) Filed: Jan. 4, 2022

(65) Prior Publication Data

US 2023/0214708 A1     Jul. 6, 2023

(51) Int. Cl.
    *G06N 20/00*     (2019.01)
    *B60Q 1/24*     (2006.01)
    (Continued)

(52) U.S. Cl.
    CPC ............. *G06N 20/00* (2019.01); *G06V 10/60* (2022.01); *G06V 10/751* (2022.01);
    (Continued)

(58) Field of Classification Search
    CPC ...... G06N 20/00; G06V 10/60; G06V 10/751; G06V 10/7715; G06T 19/006;
    (Continued)

(56) References Cited

U.S. PATENT DOCUMENTS 10,665,011 B1    5/2020    Sunkavalli et al.
2015/0205445 A1    7/2015    Pradeep et al.
(Continued)

FOREIGN PATENT DOCUMENTS

WO     2020/102771 A1     5/2020

OTHER PUBLICATIONS

Guan et al., NPL ("Scene Coordinate Regression Network With Global Context-Guided Spatial Feature Transformation for Visual Relocalization" Published Jul. 2021 (Total 8 pages) (Year: 2021).*
(Continued)

*Primary Examiner* — Quoc A Tran
(74) *Attorney, Agent, or Firm* — NIXON & VANDERHYE (57) ABSTRACT

An image processing method generates a training dataset for training a machine learning model to predict illumination conditions for different positions relative to a scene, the training dataset including training images and reference data. The method includes: obtaining a training image of a training scene acquired by a first camera having an associated first coordinate system; determining local illumination maps associated to a respective position in the training scene in a respective second coordinate system and representing illumination received from different directions around the position; transforming the position of each local illumination map from the second to the first coordinate system; responsive to determining that the transformed position of a local illumination map is visible: transforming the local illumination map from the second to the first coordinate system and including the transformed local illumination map and its transformed position in the reference data associated to the training image.

22 Claims, 4 Drawing Sheets

(51) Int. Cl.
    *G06T 15/50*     (2011.01)
    *G06T 19/00*     (2011.01)
    *G06V 10/60*     (2022.01)
    *G06V 10/75*     (2022.01)
    *G06V 10/77*     (2022.01)
    *H04N 23/74*     (2023.01)

(52) U.S. Cl.
    CPC .......... *G06V 10/7715* (2022.01); *B60Q 1/249* (2022.05); *G06T 15/506* (2013.01); *G06T 19/006* (2013.01); *H04N 23/74* (2023.01); *Y10S 209/938* (2013.01)

(58) Field of Classification Search
    CPC ... G06T 15/506; H04N 23/74; Y10S 209/938; B60Q 1/249
    See application file for complete search history.

(56) References Cited

U.S. PATENT DOCUMENTS

| | | | |
|---|---|---|---|
| 2018/0012411 A1 | 1/2018 | Richey et al. | |
| 2020/0302684 A1* | 9/2020 | Sunkavalli | G06T 15/506 |
| 2020/0342652 A1* | 10/2020 | Rowell | G06V 10/82 |

OTHER PUBLICATIONS

Garon et al., "Fast Spatially—Varying Indoor Lighting Estimation", Jun. 2019, 10 pages.

Ronneberger et al., "U-Net: Convolutional Networks for Biomedical Image Segmentation", Computer Science Department and BIOSS Centre for Biological Signalling Studies, University of Freiburg, Germany, 2015, pp. 234-241

International Search Report for PCT/EP2022/087510 dated Apr. 18, 2023, 4 pages.

Garon et al., "Fast Spatially-Varying Indoor Lighting Estimation," 2019 IEEE/CVF Conference on Computer Vision and Pattern Recognition (CVPR), 2019, pp. 6901-6910.

Song et al., "Neural Illumination: Lighting Prediction for Indoor Environments," arXiv.org, Cornell University Library, 2019, 17 pages.

Srinivasan et al., "Lighthouse: Predicting Lighting Volumes for Spatially-Coherent Illumination," 2020 IEEE/CVF Conference on Computer Vision and Pattern Recognition (CVPR), 2020, pp. 8077-8086.

Gardner et al., "Learning to Predict Indoor Illumination from a Single Image," ACM Transactions on Graphics, vol. 36, No. 6, Nov. 2017, 14 pages.

* cited by examiner

IMAGE PROCESSING METHODS AND SYSTEMS FOR TRAINING A MACHINE LEARNING MODEL TO PREDICT ILLUMINATION CONDITIONS FOR DIFFERENT POSITIONS RELATIVE TO A SCENE

BACKGROUND OF THE INVENTION

Field of the Invention

The present disclosure relates to image processing and relates more specifically to methods and computing systems for training a machine learning model to predict illumination conditions for different positions relative to a scene, based e.g. on an input image representing said scene.

Description of the Related Art

Estimating the illumination conditions for a given position relative to a scene can be used for e.g. augmented reality applications.

Indeed, in such augmented reality applications, the goal is typically to insert a virtual object in an image (single image or within a video). The rendering of the virtual object should be as realistic as possible, in order to make the virtual object look as if it was actually present in the scene when the image of said scene was captured. In particular, the illumination conditions in the scene should be taken into account in order to make this rendering realistic. For instance, if the scene is illuminated from the right for a given position of a camera acquiring the image of the scene, then a virtual object inserted in said image should be rendered as if it was illuminated from the right, etc. Hence, there is a need for accurately estimating the illumination conditions in a scene in order to perform a more realistic rendering of a virtual object to be inserted in an image representing said scene.

In the prior art, machine learning models have been proposed for estimating the illumination conditions in a scene. In particular, some prior art methods are based on supervised learning and use a training dataset containing training images and reference data (a.k.a. "ground-truth" data). Each training image represents a training scene and the reference data associated to a training image is representative of the illumination conditions in the training scene. Training a machine learning model using such a training dataset corresponds to training the machine learning model to predict the illumination conditions (reference data) in the training scene from the associated training image.

In prior art solutions, the generation of the training dataset usually uses one reference object, usually a gray sphere or a mirror sphere, which is arranged in the training scene. However, since there is only one reference object used, the illumination conditions are estimated once for the training scene. The machine learning model will therefore be trained to predict a single set of illumination conditions for a whole scene, which will always be applied for the rendering of the virtual object regardless the position of the virtual object relative the scene.

In practice, the illumination conditions can vary with the position relative to the scene, under spatially varying light conditions. Under such spatially varying light conditions, the rendering of the virtual object might not be realistic for all the positions of the virtual object relative to the scene if a single and same set of illumination conditions is used for the whole scene.

Hence there is a need for a training dataset that would enable training a machine learning model to predict accurately different illumination conditions for different positions relative to a scene, in order to be able to selectively adapt the rendering of the illumination of the virtual object on the basis of the position of said virtual object relative to the scene.

To overcome this issue and address spatially varying light conditions, [Garon+2019] proposes to use several gray spheres spread across the environment of a scene. Hence, a plurality of sets of illumination conditions are estimated, one for each gray sphere in the scene. However, in order to train a machine learning model, very large training datasets are required. While the method proposed in [Garon+2019] does enable generating a training image with different illumination conditions associated to respective positions relative to the training scene, it does not scale when a very large number of training images (and associated reference data) need to be generated since. Indeed, for each training image, multiple gray spheres need to be manually positioned in the scene. Also, a first image needs to be acquired by a camera with the multiple gray spheres in the scene and a second image, used as training image, needs to be acquired with the same position and orientation of the same camera relative to the scene, with the same light conditions and without the multiple gray spheres in the scene. The authors in [Garon+2019] actually ended up by generating virtual training images by simulating virtual training scenes and virtual illuminants and used this fully synthetic training dataset to train their machine learning model.

Hence there is a need for a solution that would enable generating a large training dataset of training images representing realistic training scenes (i.e. non-virtual training scenes) and, for each training scene, reference data representative of the spatially varying light conditions relative to the scene.

SUMMARY OF THE INVENTION

The present disclosure aims at improving the situation. In particular, the present disclosure aims at overcoming at least some of the limitations of the prior art discussed above.

In particular, the present disclosure aims at proposing a solution for enabling generating a large training dataset that can be used to train a machine learning model to predict spatially varying illumination conditions.

For this purpose, and according to a first aspect, the present disclosure relates to an image processing method for generating a training dataset for training a machine learning model to predict illumination conditions for different positions relative to a scene, said training dataset comprising training images and reference data, said image processing method comprising:

obtaining a training image of a training scene, to be included in the training dataset, acquired by a first camera having a first coordinate system associated thereto, determining a plurality of local illumination maps, each local illumination map being associated to a respective position relative to the training scene in a respective second coordinate system and representing in said respective second coordinate system the illumination received from different directions of arrival around said respective position, transforming the position of each local illumination map from the respective second coordinate system to the first coordinate system, responsive to determining that the transformed position of a local illumination map is visible in the training image: transforming said local illumination map from the respective second coordinate system to the first coordinate system and including the transformed local illumination map and its transformed position in the reference data associated to the training image.

Hence, a plurality of local illumination maps are determined for a plurality of positions relative to a training scene. Each local illumination map represents the illumination conditions for the respective position associated thereto. Each local illumination map is represented in a respective second coordinate system relative to the training scene. All these local illumination maps are associated to the training scene.

A training image representing the same training scene is obtained by a first camera having a first coordinate system associated thereto. For instance, the first coordinate system is defined by the pose (i.e. the position and orientation) of the first camera in a reference coordinate system. The training image is preferably acquired with the same illuminants illuminating the training scene as those for which the local illumination maps have been determined.

Then, the imaging processing method searches for positions of local illumination maps which are visible in the training image, by transforming said positions from their respective second coordinate systems to the first coordinate system. When finding a transformed position which is visible in the training image, the associated local illumination map is included in the reference data of the training image. However, such a local illumination map is beforehand transformed from its respective second coordinate system to the first coordinate system, in order to obtain a transformed local illumination map as seen from the first camera. Indeed, in the respective second coordinate system, the local illumination map is determined as seen from a respective second viewing point, around a reference direction between said respective second viewing point and the respective position associated to said local illumination map. In the first coordinate system, the reference direction becomes the direction between a first viewing point (which corresponds to the position of the first camera) and the transformed position of the local illumination map, which will generally be different from the reference direction considered in the respective second coordinate system, such that the local illumination map needs to be transformed (typically rotated) in order to be included in the reference data associated to the training image.

Advantageously, a plurality of positions of respective local illumination maps can be visible in the training image, such that a plurality of local illumination maps associated to different positions relative to the training scene can be included as reference data for this training image, by performing transformation calculations between different coordinate systems. If a plurality of positions are visible in a same training image, then the training image can be e.g. included in the training dataset with reference data representative of all local illumination maps associated to positions visible in the training image. Alternatively, or in combination thereof, the training image may be replicated, and the local illumination maps associated to positions visible in the training image may be split among the replicas of the training image, wherein each replica of the training image is included with its respective subset of local illumination maps in the training dataset.

Of course, a plurality of different training images of the same training scene may be acquired by the first camera, by e.g. moving the first camera relative to the training scene, and the above steps can be carried out for each different training image of the training scene. For instance, it is possible to acquire a training sequence (e.g. a training video) of the training scene, while moving the first camera relative to the training scene, and to carry out the above mentioned steps for each training image composing the training sequence, with the same set of local illumination maps. Hence, the present disclosure enables to quickly build a large training dataset wherein each training image of the training scene may have a plurality of illumination conditions (i.e. local illumination maps) associated to different positions relative to the training scene, by transforming for each training image a same set of illumination maps associated to said training scene.

In specific embodiments, the image processing method may further comprise one or more of the following optional features, considered either alone or in any technically possible combination.

In specific embodiments, determining a plurality of local illumination maps comprises:
acquiring, by an imaging device, a reference sequence of the training scene while moving the imaging device relative to the training scene, said reference sequence comprising a plurality of reference images, wherein said imaging device comprises a second camera for acquiring the reference sequence and a reference object arranged in a field of view of the second camera,
determining a pose of the second camera relative to the training scene when acquiring each reference image of the reference sequence, and a corresponding second coordinate system associated to the second camera,
extracting the reference object from each reference image,
estimating a local illumination map for each reference image, based on the reference object extracted from said each reference image.

The reference sequence may be e.g. a reference video, or a set of reference images acquired successively when moving the second camera relative to the training scene.

In specific embodiments, the first camera and the second camera are a same camera, and the training image is a reference image of the reference sequence. Hence, in such a case, the same camera is used to determine the local illumination maps and to perform the acquisition of the training images. Said camera acquires a reference sequence composed of reference images and each reference image is used to determine a local illumination map and its position with respect to the pose of the camera when acquiring said reference image. Then each reference image of the reference sequence is considered as a training image and, for each training image, the image processing method evaluates if the positions of the local illumination maps determined for the other training images of the reference sequence are visible in the considered training image. In other words, the reference data of a given training image in a reference sequence is built by including all or part of the local illumination maps determined for the other training images of the same reference sequence.

In specific embodiments, the first camera is included in the imaging device and is separate from the second camera, and the first camera acquires one or more training images simultaneously with the acquisition of the reference sequence by the second camera.

In specific embodiments, the pose of the second camera is estimated by a simultaneous localization and mapping, SLAM, algorithm.

In specific embodiments, the reference object is a sphere having a predetermined color.

In specific embodiments, estimating a local illumination map based on an extracted reference object comprises iterating, until a stop criterion is satisfied, steps of:
rendering a candidate reference object based on a candidate local illumination map,
comparing the candidate reference object with the extracted reference object, and
updating the candidate local illumination map based on a result of the comparison of the candidate reference object with the extracted reference object.

In specific embodiments, the image processing method further comprises white balance correcting and/or color correcting and/or exposure correcting the reference images with respect to the training image.

In specific embodiments, transforming a local illumination map further comprises white balance correcting and/or color correcting and/or exposure correcting said local illumination map with respect to the training image.

In specific embodiments, the image processing method further comprises using the training dataset to train the machine learning model to enable predicting each local illumination map associated to a training image when applied to said training image.

According to a second aspect, the present disclosure relates to an image processing system for generating a training dataset for training a machine learning model to predict illumination conditions for different positions relative to a scene, said training dataset comprising training images and reference data, said image processing system comprising a dataset generating unit comprising at least one memory and at least one processor, wherein said at least one processor of the dataset generating unit is configured to:
obtain a training image of a training scene, to be included in the training dataset, acquired by a first camera having a first coordinate system associated thereto,
determine a plurality of local illumination maps, each local illumination map being associated to a respective position relative to the training scene in a respective second coordinate system and representing in said respective second coordinate system the illumination received from different directions of arrival around said respective position,
transform the position of each local illumination map from the respective second coordinate system to the first coordinate system,
responsive to determining that the transformed position of a local illumination map is visible in the training image: transform said local illumination map from the respective second coordinate system to the first coordinate system and include the transformed local illumination map and its transformed position in the reference data associated to the training image.

In specific embodiments, the image processing system may further comprise one or more of the following optional features, considered either alone or in any technically possible combination.

In specific embodiments, the at least one processor of the dataset generating unit is further configured to determine a plurality of local illumination maps by:
acquiring, by an imaging device, a reference sequence of the training scene while moving the imaging device relative to the training scene, said reference sequence comprising a plurality of reference images, wherein said imaging device comprises a second camera for acquiring the reference sequence and a reference object arranged in a field of view of the second camera,
determining a pose of the second camera relative to the training scene when acquiring each reference image of the reference sequence, and a corresponding second coordinate system associated to the second camera,
extracting the reference object from each reference image,
estimating a local illumination map for each reference image, based on the reference object extracted from said each reference image.

In specific embodiments, the first camera and the second camera are a same camera, and the training image is a reference image of the reference sequence.

In specific embodiments, the first camera is included in the imaging device and is separate from the second camera, and the first camera acquires one or more training images simultaneously with the acquisition of the reference sequence by the second camera.

In specific embodiments, the pose of the second camera is estimated by a simultaneous localization and mapping, SLAM, algorithm.

In specific embodiments, the reference object is a sphere having a predetermined color.

In specific embodiments, the at least one processor of the dataset generating unit is further configured to estimate a local illumination map based on an extracted reference object by iterating, until a stop criterion is satisfied, steps of:
rendering a candidate reference object based on a candidate local illumination map,
comparing the candidate reference object with the extracted reference object, and
updating the candidate local illumination map based on a result of the comparison of the candidate reference object with the extracted reference object.

In specific embodiments, the at least one processor of the dataset generating unit is further configured to white balance correct and/or color correct and/or exposure correct the reference images with respect to the training image.

In specific embodiments, the at least one processor of the dataset generating unit is further configured to, when transforming a local illumination map further, white balance correcting and/or color correcting and/or exposure correcting said local illumination map with respect to the training image.

In specific embodiments, the image processing system further comprises a training unit comprising at least one processor configured to use the training dataset to train the machine learning model to enable predicting each local illumination map associated to a training image when applied to said training image.

According to a second aspect, the present disclosure relates to a non-transitory computer readable medium comprising computer readable code which, when executed by one or more processors, cause said one or more processors to generate a training dataset for training a machine learning model to predict illumination conditions for different positions relative to a scene, said training dataset comprising training images and reference data, wherein said computer readable code causes said one or more processors to:
obtain a training image of a training scene, to be included in the training dataset, acquired by a first camera having a first coordinate system associated thereto,
determine a plurality of local illumination maps, each local illumination map being associated to a respective position relative to the training scene in a respective second coordinate system and representing in said respective second coordinate system the illumination received from different directions of arrival around said respective position, transform the position of each local illumination map from the respective second coordinate system to the first coordinate system, responsive to determining that the transformed position of a local illumination map is visible in the training image: transform said local illumination map from the respective second coordinate system to the first coordinate system and include the transformed local illumination map and its transformed position in the reference data associated to the training image.

BRIEF DESCRIPTION OF THE DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in figures is provided only for illustration purposes and is not meant to limit the present disclosure which may be applied with the same steps executed in a different order.

DESCRIPTION OF THE PREFERRED EMBODIMENTS

As indicated above, the present disclosure relates inter alia to an image processing method and system for generating a training dataset for training a machine learning model to predict illumination conditions for different positions relative to a scene, based on one or more images of said scene. Such predicted illumination conditions can be used e.g. for augmented reality applications, for the rendering of a virtual object to be inserted in an image (single image or within a video) representing said scene.

Hence, the machine learning model is trained via supervised learning. It is well known that, in such a case, the machine learning model undergoes mainly two different phases, as represented in FIG. 1, namely:

a training phase 11 during which the machine learning model is trained by using a training dataset, a predicting phase 12 during which the trained machine learning model is then applied to input images from which illumination conditions are to be predicted.

Figure 1:
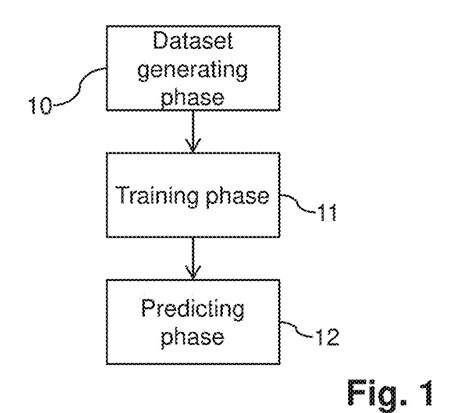
FIG. 1: a diagram representing the main phases of supervised learning for a machine learning model.

As illustrated by FIG. 1, the training dataset can be generated during a dataset generating phase 10 and used during the training phase 11.

It is emphasized that the dataset generating phase 10, the training phase 11 and the predicting phase 12 can be executed separately, independently from one another, the training phase 11 receiving as input the training dataset generated during the dataset generating phase 10 and the predicting phase 12 receiving as input the machine learning model trained during the training phase 11. For instance, the dataset generating phase 10 may be executed by a dataset generating unit 20, the training phase 11 may be executed by a training unit 30 and the predicting phase 12 may be executed by a predicting unit 40. The dataset generating unit 20, the training unit 30 and the predicting unit 40 may be all separate, i.e. they may be embedded in respective separate computing systems, or two or more of the dataset generating unit 20, the training unit 30 and the predicting unit 40 may be embedded in a same computing system (in which case they can share hardware resources such as processors, memories, etc.). In the present disclosure, an image processing system may comprise at least one among the dataset generating unit 20, the training unit 30 and the predicting unit 40, and an image processing method may comprise at least one among the dataset generating phase 10, the training phase 11 and the predicting phase 12

Figure 2:
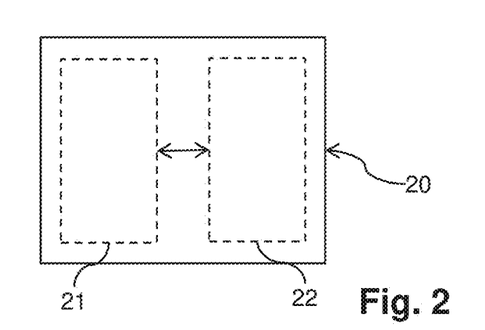
FIG. 2: a schematic representation of an exemplary embodiment of a dataset generating unit.

FIG. 2 represents schematically an exemplary embodiment of a dataset generating unit 20. As illustrated by FIG. 2, the dataset generating unit 20 comprises one or more processors 21 and one or more memories 22. The one or more processors 21 may include for instance a central processing unit (CPU), a graphics processing unit (GPU), a neural processing unit (NPU), a digital signal processor (DSP), a field-programmable gate array (FPGA), an application specific integrated circuit (ASIC), etc. The one or more memories 22 may include any type of computer readable volatile and non-volatile memories (magnetic hard disk, solid-state disk, optical disk, electronic memory, etc.). The one or more memories 22 may store a computer program product, in the form of a set of program-code instructions to be executed by the one or more processors 21 in order to implement all or part of the steps of the dataset generating phase 10. Once the training dataset has been generated, it can be stored in the one or more memories 22 and/or it can be stored in a remote database (not shown in the figures) and/or it can be sent to the training unit 30.

Figure 3:
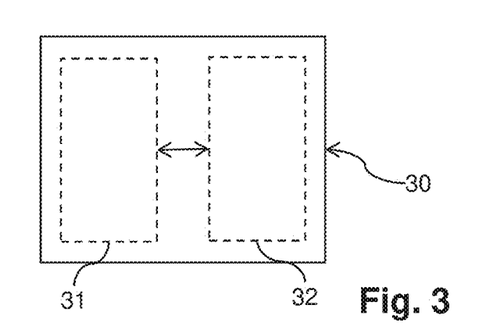
FIG. 3: a schematic representation of an exemplary embodiment of a training unit.

FIG. 3 represents schematically an exemplary embodiment of a training unit 30. As illustrated by FIG. 3, the training unit 30 comprises one or more processors 31 and one or more memories 32. The one or more processors 31 may include for instance a CPU, a GPU, a NPU, a DSP, an FPGA, an ASIC, etc. The one or more memories 32 may include any type of computer readable volatile and non-volatile memories (magnetic hard disk, solid-state disk, optical disk, electronic memory, etc.). The one or more memories 32 may store a computer program product, in the form of a set of program-code instructions to be executed by the one or more processors 31 in order to implement all or part of the steps of the training phase 11 of the machine learning model used for predicting illumination conditions.

For instance, the training dataset may be stored in the one or more memories 32 after it has been retrieved from e.g. a remote database or directly from the dataset generating unit 20. Once the machine learning model has been trained, it can be stored in the one or more memories 32 and/or it can be stored in a remote database (not shown in the figures) and/or it can be sent to the predicting unit 40.

Figure 4:
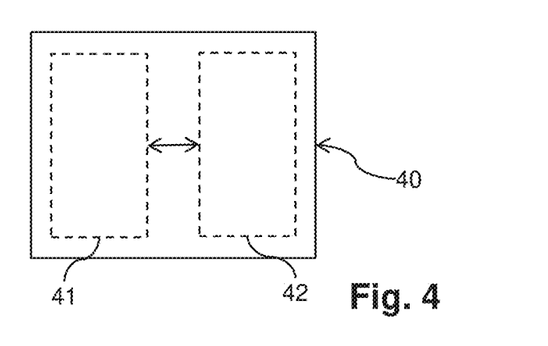
FIG. 4: a schematic representation of an exemplary embodiment of a predicting unit.

FIG. 4 represents schematically an exemplary embodiment of a predicting unit 40. As illustrated by FIG. 4, the predicting unit 40 comprises one or more processors 41 and one or more memories 42. The one or more processors 41 may include for instance a CPU, a GPU, a NPU, a DSP, a FPGA, an ASIC, etc. The one or more memories 42 may include any type of computer readable volatile and non-volatile memories (magnetic hard disk, solid-state disk, optical disk, electronic memory, etc.). The one or more memories 42 may store a computer program product, in the form of a set of program-code instructions to be executed by the one or more processors 41 in order to predict illumination conditions based on one or more input images by using a trained machine learning model. For instance, the trained machine learning model may be stored in the one or more memories 42 of the predicting unit 40 after it has been retrieved from e.g. a remote database or directly from the training unit 30.

Figure 5:
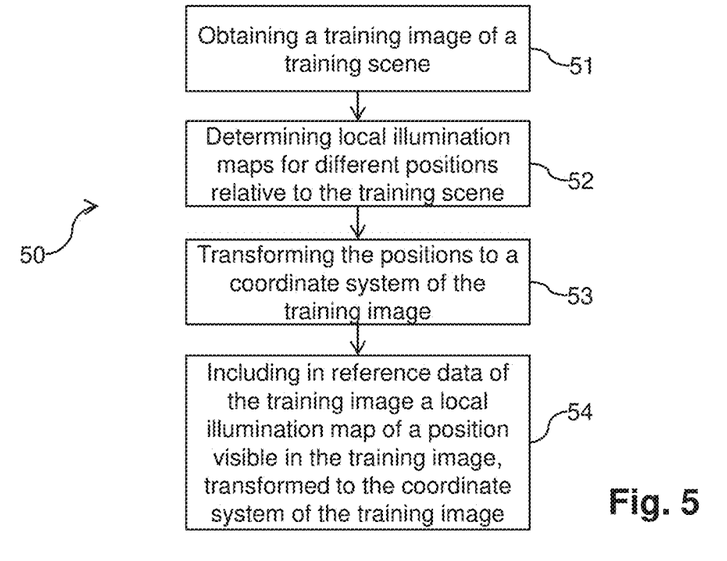
FIG. 5: a diagram representing the main steps of an exemplary embodiment of an image processing method for generating a training dataset for training a machine learning model to predict illumination conditions for different positions relative to a scene.

FIG. 5 represents schematically the main steps of an image processing method 50 for generating a training dataset, to be used to train a machine learning model used for predicting illumination conditions for different positions relative to a scene.

As discussed above, the training dataset comprises training images and associated reference data (a.k.a. "ground-truth" data). Each training image represents a training scene (indoor or outdoor) and the reference data associated to a training image is representative of the illumination conditions in the training scene. The training dataset generated comprises advantageously, for each training image included in the training dataset, a plurality of illumination conditions for different positions relative to the training scene.

As illustrated by FIG. 5, the image processing method 50 comprises a step 51 of obtaining a training image of a training scene, to be included in the training dataset. The training image is acquired by a first camera 91 having a first coordinate system associated thereto. For instance, the first coordinate system is defined by the pose (i.e. the position and orientation) of the first camera 91 in a reference coordinate system. The training image is typically composed of a plurality of pixels, and each pixel corresponds preferably to a vector comprising values of respective color channels in a predetermined color space. For instance, the predetermined color space may be the red-blue-green (RGB) color space, the hue-saturation-value (HSV) color space, or any suitable color space known to the skilled person. Preferably, the vector comprises also at least one channel representative of a depth between the first camera and the training scene. For instance, the training image is an RGBD image.

Also, the image processing method 50 comprises a step S52 of determining a plurality of local illumination maps, each local illumination map being associated to a respective position relative to the training scene. Each local illumination map and its position relative to the training scene are determined in a respective second coordinate system. Typically, the second coordinate system associated to a local illumination map is defined by the pose (i.e. position and orientation), in the reference coordinate system, of a device used for determining said local illumination map. In some embodiments, the device is an imaging device 90 which will be discussed in more details hereinafter.

Figure 6:
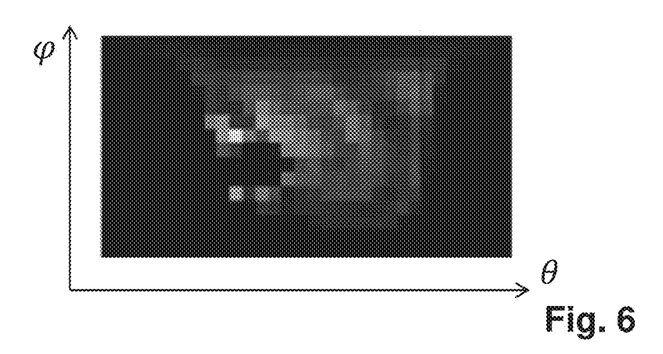
FIG. 6: an example of a local illumination map.

Each local illumination map is representative of the illumination received from different directions of arrival around the position associated to said local illumination map. For instance, each direction of arrival may be defined by azimuth and elevation angles around the considered position, defined with respect to a reference direction which depends on the second coordinate system. For instance, if the second coordinate system is defined by three orthogonal axes $X_n$, $Y_n$, $Z_n$ intersecting at a center point $O_n$, wherein n is the index of the considered local illumination map among all determined local illumination maps (with $1 \leq n \leq N$ and N being the total number of local illumination maps), and if the position associated to the local illumination map of index n is denoted by $P_n$, then the reference direction may be the axis $(O_n, P_n)$. For instance, the azimuth angle $\theta$ may be the angle between the considered direction of arrival and the reference direction $(O_n, P_n)$ measured in the plane $((O_n, P_n), X_n)$ comprising both the reference direction $(O_n, P_n)$ and the axis $X_n$, and the elevation angle $\varphi$ may be the angle between the considered direction of arrival and the plane $((O_n, P_n), X_n)$. The local illumination map corresponds for instance to an image in which each pixel represents the illumination received for each direction of arrival $(\theta, \varphi)$ around the position $P_n$, wherein the azimuth angle 9 may take discrete values in 0, 360° [and the elevation angle $\varphi$ may take discrete values in [−90°, 90° 1, for instance. The value of each pixel (i.e. the illumination received for a given direction of arrival) is for instance expressed in a predetermined color space, e.g. a RGB color space or any other color space known to the skilled person. FIG. 6 represents schematically a local illumination map provided as an image in which each pixel represents the illumination received for a respective direction of arrival, expressed in this non-limitative example as a grayscale value.

The image processing method 50 then searches for positions $P_n$ of local illumination maps which are visible in the training image obtained during step 51. For that purpose, the image processing method 50 comprises a step 53 of transforming the position of each local illumination map from the respective second coordinate system to the first coordinate system. Indeed, for a given local illumination map of index n, both the first coordinate system and the respective coordinate system are either known or determinable in the reference coordinate system, such that the transformation to be applied for passing from the first coordinate system to the respective second coordinate system (or vice versa) is either known or can be determined. It should be noted that, in some cases, the reference coordinate system can be e.g. the first coordinate system, in which case the second coordinate system is defined with respect to the first coordinate system (or vice versa). For instance, if the second coordinate system is defined by a pose of device, then it is sufficient to know or determine a relative pose of said device with respect to the pose of the first camera when acquiring the considered training image. The relative pose corresponds to a difference between the respective positions of the first camera and the device (i.e. a translation) and a difference between the respective orientations of the first camera 91 and the device (i.e. a rotation).

Hence, for the local illumination map of index n, the position $P_n$ is expressed in the first coordinate system and the transformed position is denoted $P'_n$. When the transformed position $P'_n$ is determined, it is possible to evaluate whether or not this transformed position $P'_n$ is visible in the training image. If the transformed position $P'_n$ is not visible in the training image, then the associated local illumination map should not be included in the reference data of the considered training image.

In turn, if the transformed position $P'_n$ is visible in the training image, then the image processing method 50 comprises a step 54 of transforming the corresponding local illumination map of index n from the respective second coordinate system to the first coordinate system.

For instance, if the first coordinate system is defined by three orthogonal axes X, Y, Z intersecting at a center point O, wherein 0 corresponds to the position of the first camera 91, then the reference direction $(O_n, P_n)$ in the second coordinate system may be expressed in the first coordinate system as $(O'_n, P'_n)$. In the first coordinate system, the reference direction for the transformed local illumination map corresponds to the axis $(O, P'_n)$. In the first coordinate system, the azimuth angle σ' may be the angle between the considered direction of arrival and the reference direction $(O, P'_n)$ measured in the plane $((O, P'_n), X)$ comprising both the reference direction $(O, P'_n)$ and the axis X, and the elevation angle φ' may be the angle between the considered direction of arrival and the plane $((O, P'_n), X)$. Hence, transforming the local illumination of index n from the respective second coordinate system to the first coordinate system resumes to transforming the angles (O, φ) in the second coordinate system into angles (σ', φ'), and this transformation is mainly a rotation which depends on the angles in the first coordinate system between the reference directions $(O'_n, P'_n)$ and $(O, P'_n)$.

During step 54, the transformed local illumination map and its associated transformed position are included in the reference data associated to the training image. The transformed position may be included in all or part. For instance, in some embodiments, only the direction of the transformed position $P'_n$ in the field of view of the first camera 91 may be needed, and not the distance between the first camera. In such a case, the transformed position included in the reference date may be a 2D position and may be expressed as the coordinates of the pixel in the training image representing the transformed position $P'_n$. In other embodiments, the transformed position may be included in the reference data as a 3D position, which may be expressed as e.g. the coordinates of the pixel in the training image representing the transformed position $P'_n$ and the distance between the first camera 91 when acquiring the training image and the transformed position $P'_n$.

Hence, all the local illumination maps associated to positions visible in the training image can be included in the reference data of the training image, mainly by performing transformation calculations between different coordinate systems. This can be performed for different training images (obtained for different poses of the first camera 91) of the same training scene by using the same set of local illumination maps. Hence, it is possible to quickly generate a large training dataset wherein each training image of the training scene may have a plurality of illumination conditions (i.e. local illumination maps) associated to different positions relative to the training scene, by transforming for each training image a same set of local illumination maps associated to said training scene. Similar operations can be performed for different training scenes, to further increase the training dataset to be used for training the machine learning model.

Figure 7:
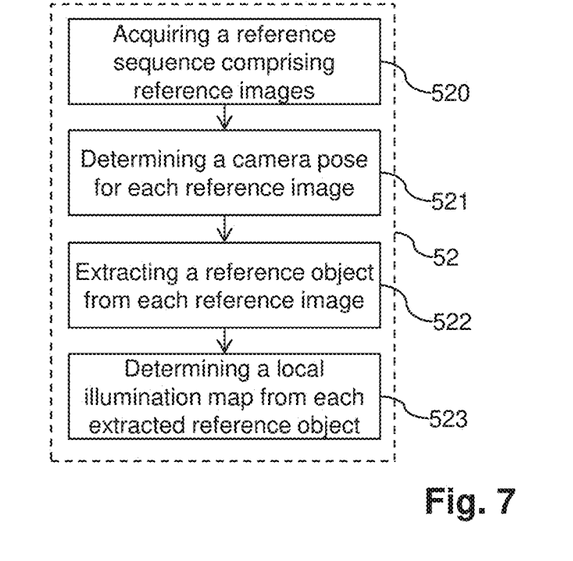
FIG. 7: a diagram representing the main steps of an exemplary embodiment of a step of determining local illumination maps.

FIG. 7 represents schematically an exemplary embodiment of the step 54 of determining the local illumination maps for different positions relative to the training scene.

As illustrated by FIG. 7, the step 54 of determining the local illumination maps comprises a step 520 of acquiring, by an imaging device 90, a reference sequence of the training scene while moving the imaging device 90 relative to the training scene.

The reference sequence is a set of reference images acquired successively when moving the second camera 92 relative to the training scene. In preferred embodiments, the reference sequence is a video. In the sequel, it is assumed in a non-limitative manner that the reference sequence is a video.

The imaging device 90 comprises a second camera 92 for acquiring the reference video and is configured to maintain a reference object 93 arranged in a field of view of the second camera 92 when acquiring the reference video. The reference object 93 is preferably maintained in a substantially fixed position with respect to the second camera 92, when acquiring the reference video. Hence, the reference object 93 is substantially immobile in the field of view of said second camera 92, and its position with respect to the second camera 92 is either known or can be determined.

Also, the step 52 of determining the local illumination maps further comprises a step 521 of determining a pose of the second camera 92 relative to the training scene when acquiring each reference image of the reference video, which defines a corresponding second coordinate system associated to the second camera 92. Basically, the pose and the associated second coordinate system are determined in a reference coordinate system, which may be for instance the second coordinate system of the first reference image of the reference video. In such a case, the second coordinate system and the pose of the second camera 92 when acquiring the first reference image needs not to be determined and it is sufficient to determine the relative pose of the second camera 92 when acquiring the subsequent reference images of the reference video, with reference to the pose of the first reference image or with respect to e.g. the previous reference image in the reference video.

For instance, the successive poses of the second camera 92 when acquiring the reference video, which may be relative poses, are determined by a pose determining unit 96, which may be included in the imaging device 90. The pose determining unit 96 may be of any suitable type known to the skilled person. For instance, the pose determining unit 96 may comprise one or more sensors (accelerator, gyroscope, etc.) and a processing circuit comprising one or more processors and one or more memories which store a computer program product, in the form of a set of program-code instructions. Said computer program product is executed by the one or more processors of the pose determining unit 96 in order to estimate the successive poses of the second camera 92 when acquiring the reference video, based on the measurements of the one or more sensors and, optionally, based on the reference images acquired by the second camera 92. In some embodiments, the pose determining unit 96 is configured to estimate the successive poses of the second camera 92 by using a simultaneous localization and mapping, SLAM, algorithm. Any type of SLAM algorithm may be used (for instance based on a particle filter or on a Kalman filter, the GraphSLAM algorithm, ORB-SLAM2, LSD-SLAM, etc.), and the choice of a specific SLAM algorithm corresponds to a non-limitative embodiment of the present disclosure.

Also, the step 52 of determining the local illumination maps further comprises a step 522 of extracting the reference object 93 from each reference image of the reference video. Basically, the reference object 93 is used as a light probe and is an object having a predetermined shape, color and reflectance. For instance, the reference object 93 is a sphere having a predetermined color, preferably a neutral color such as gray. Also, the reflectance of the reference object can be predetermined, and includes preferably a mix of diffuse and specular reflection. More generally, the reference object 93 may have any shape, color and reflectance suitable for being used as a light probe. In some embodiments, the size of the reference object 93 may also be predetermined, for instance in order to be able to estimate the distance between the reference object 93 and the second camera 92 directly from the reference images acquired by said second camera 92. Since the shape and color of the reference object 93 are known, it is possible to extract it from the reference images by using algorithms considered known to the skilled person, for instance using a Chamfer matching algorithm, or using a segmentation algorithm which may use a neural network previously trained to detect and extract the reference object 93 from an input image.

In some embodiments, the step 522 of extracting the reference object 93 may include a shape correction of the extracted reference object 93. For instance, assuming the reference object 93 to be a sphere, then if the sphere is placed at the bottom of the field of view of the second camera 92 (e.g. to maximize training scene information), it may be distorted by the lens of the second camera 92, such that its shape in a reference image may not be strictly round. Hence, this shape distortion is preferably corrected by correcting the shape of the extracted reference object 93. In such cases, any shape distortion correction method known to the skilled person may be used. For instance, if the reference object 93 is a sphere, this shape correction may be performed by the following steps:

- estimating a main axis of the extracted reference object 93 (i.e. the axis along which the length of the extracted reference object 93 is maximum), by e.g. principal component analysis, PCA, of the shape of the extracted reference object 93,
- rescaling the extracted reference object 93 along an axis orthogonal to the estimated main axis, to get a round extracted reference object 93.

Then, during a step 523, a local illumination map is estimated for each reference image, based on the reference object extracted from said each reference image. Indeed, since the shape and color of the reference object 93 are predetermined, it is possible to estimate the illumination received from different directions of arrival around said reference object 93. Since the position of the reference object 93 with respect to the second camera 92 is either known or can be determined, it is possible to estimate, for a reference image of index n, both the local illumination map and its associated position $P_n$ with respect to the (relative) pose of the second camera 92 when acquiring the considered reference image, i.e. in the second coordinate system associated to said reference image.

Figure 8:
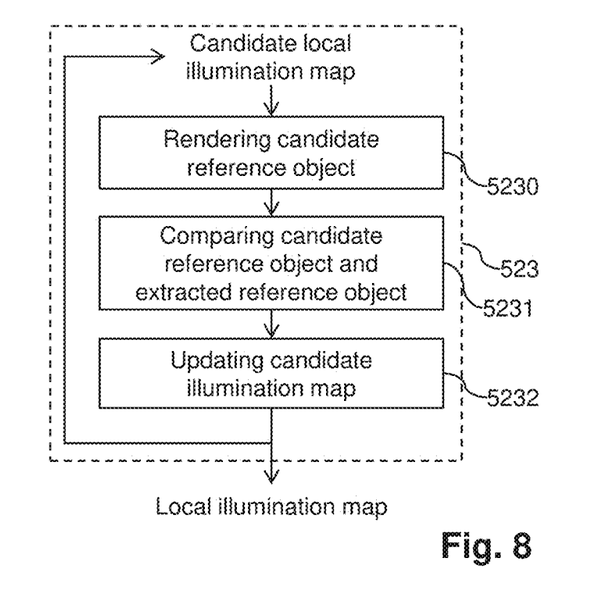
FIG. 8: a diagram representing the main steps of an exemplary embodiment of a step of estimating a local illumination map from a reference object extracted from a reference image.

FIG. 8 represents schematically an exemplary embodiment of the step 523 of estimating the local illumination maps based on an extracted reference object 93 (possibly after shape correction). As illustrated by FIG. 8, the local illumination map may be estimated based on an extracted reference object 93 by iterating steps of:

5230 rendering a candidate reference object based on a candidate local illumination map,
5231 comparing the candidate reference object with the extracted reference object 93, and
5231 updating the candidate local illumination map based on a result of the comparison of the candidate reference object with the extracted reference object.

Basically, the candidate local illumination map corresponds to an assumption on the local illumination map for the current iteration. Based on this assumption, it is possible to estimate what the reference object should look like if the candidate local illumination map were correct. Such an estimation is referred to as "candidate reference object" and may be obtained by applying the candidate local illumination map to the reference object using a rendering engine, preferably a differentiable rendering engine in order to be able to e.g. apply gradient descent methods over the successive iterations. For instance, the rendering engine is based on a bidirectional reflectance distribution function, BRDF, such as a Cook-Torrance model, but any model can be used in the rendering engine. Then the candidate reference object is compared to the extracted reference object. Of course, if the candidate local illumination map is similar to the real local illumination map, then the candidate reference object should be similar to the extracted reference object 93. Typically a loss function to be optimized may be used to compare the candidate reference object and the extracted reference object 93. For instance, the loss function may include the mean squared error, MSE, between the candidate reference object and the extracted reference object 93. Since the rendering engine is differentiable, it is possible to update the candidate illumination map using a gradient descent method, to further optimize the loss function.

These steps are iterated until a predetermined stop criterion is satisfied. Any suitable stop criterion may be used. For instance, the stop criterion is satisfied when the loss function may be considered to be sufficiently optimized (e.g. MSE below a predetermined positive threshold) and/or when the number of iterations performed reaches a predetermined maximum number of iterations, etc.

It should be noted that the first camera 91 and the second camera 92 may be a same camera or, alternatively, different cameras.

In preferred embodiments, the first camera 91 and the second camera 92 are a same camera 94. Accordingly, any image of the training scene acquired by the camera 94 can be used both as reference image (i.e. to determine a local illumination map based on the extracted reference object 93) and as training image. Hence, when acquiring a reference video, it is possible to determine a local illumination map for each reference image of the reference video. Also, each reference image may be used as training image, and may include in its reference data local illumination maps determined for other reference images of the reference video. For instance, the relative pose of the camera 94 is determined for each reference image, with respect to the previous reference image in the reference video. Hence, the relative pose of the camera can be determined between any pair of reference images of the reference video, such that the local illumination map (and its position) determined for any reference image can be transformed into the coordinate system of any other reference image of the reference video.

For instance, a reference video which lasts one minute will have typically more than a thousand reference images, which may be used to determine more than a thousand local illumination maps, which may be used to generate the reference data for more than a thousand training images. Hence, a single reference video of the training scene can be used to generate a large number of training images and, for each training image, a plurality of local illumination maps for different positions visible in said each training image.

Preferably, the reference object 93 should not be visible in the training images. Hence, each reference image, before being used as training image, is preferably cropped to discard the portion representing the reference object 93. Hence, the reference object 93 is preferably positioned in the field of view of the camera 94 such that it appears close to a border of the reference image acquired by said camera 94, in order to discard only a limited portion of said reference image to obtain the training image. The training image obtained after cropping the reference image is then used to identify positions of local illumination maps which are visible in the resulting training image.

In alternate embodiments, the first camera 91 and the second camera 92 may be separate. In order to ensure that the illuminants illuminating the training scene are substantially the same in the reference video and in the training images, the first camera 91 is preferably configured to acquire one or more training images simultaneously with the acquisition of the reference video by the second camera 92. In order to facilitate the mapping between the first coordinate system of each training image and the second coordinate system of each reference image, the first camera 91 is preferably included in the imaging device 90, in a position that remains substantially fixed over time with respect to the second camera 92. Within the imaging device, the relative pose of the second camera 92 with respect to the first camera 91 is either known or may be determined. For instance, it is possible to acquire a training video by the first camera 91 while simultaneously acquiring the reference video by the second camera 92. The relative pose of the first camera 91 may be determined for each training image, with respect to the previous training image in the training video. Similarly, the relative pose of the second camera 92 may be determined for each reference image, with respect to the previous reference image in the reference video. Hence, the relative pose of the second camera 92 with respect to the first camera 91 may be determined between any reference image/training image pair, such that the local illumination map (and its position) determined for any reference image of the reference video can be transformed into the coordinate system of any training image of the training video.

Preferably, the first camera 91 and the reference object 93 are arranged such that the reference object 93 is not in the field of view of the first camera 91. Hence, the position of the local illumination map determined for a reference image is not visible in the training image acquired simultaneously with this reference image. Also, the training images need not to be cropped since they do not represent the reference object 93.

For instance, it is possible to acquire simultaneously a reference video and a training video lasting one minute each. The reference video will have typically more than a thousand reference images, and the training video will have typically more than a thousand training images. The reference images can be used to determine more than a thousand local illumination maps, which may be used to generate the reference data for more than a thousand training images. Hence, a single reference video and a single training video of the same training scene can be used to generate a large number of training images and, for each training image, a plurality of local illumination maps for different positions visible in said each training image.

Figure 9:
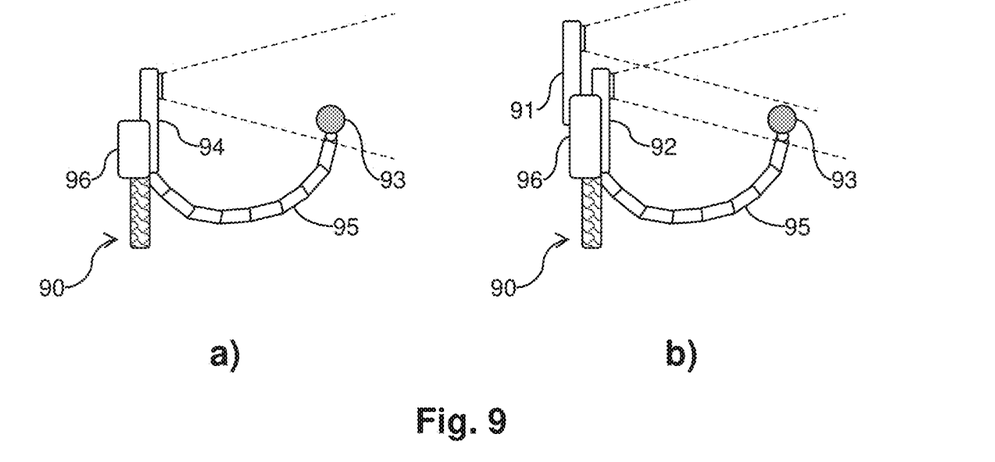
FIG. 9: schematic representations of exemplary embodiments of an imaging device which may be used by the image processing method of FIG. 5, FIG. 10: an example of a training image.

FIG. 9 represents schematically exemplary embodiments of the imaging device 90. As illustrated by FIG. 9, the imaging device 90 comprises an articulated arm 95 which carries the reference object 93.

Part a) of FIG. 9 represents an imaging device 90 in which the first camera and the second camera are a single and same camera 94. The camera 94 is connected to the articulated arm 95. The camera 94 may be of any suitable type and may in some embodiments belong to e.g. a mobile phone. For instance, the articulated arm 95 may comprise an adapter to connect to different types of mobiles phones.

Part b) of FIG. 9 represents an imaging device 90 in which the first camera 91 and the second camera 92 are separate cameras. Both the first camera 91 and the second camera 92 are connected to the articulated arm, which comprise one adapter for each of the first camera 91 and the second camera 92, to connect to different types of mobile phones.

In the example illustrated by FIG. 9, the articulated arm 95 further carries the pose determining unit 96. However, in alternate embodiments, the pose determining unit 96 may also be separate from the imaging device 90 or may be included in a mobile phone used in the imaging device 90.

Figure 10:
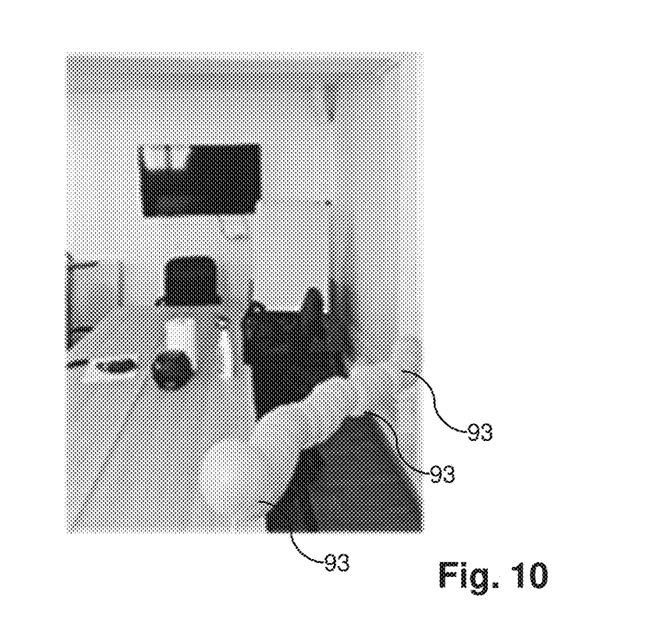

FIG. 10 represents schematically a training image representing a training scene (indoor meeting room in this example). For illustration purposes only, the reference object 93 is represented in this training image for each position in the training image having a local illumination map associated thereto. As can be seen in FIG. 10, a plurality of local illumination maps have been included for a plurality of different positions relative to the training scene. In the example illustrated by FIG. 10, a single camera 94 was used to acquire a reference video while bringing the camera 94 closer to the training scene. The training image represented in FIG. 10 corresponds to the first image of the reference video, when the camera 94 was located furthest from the training scene, while the local illumination maps included in the training image (represented as replicas of the reference object 93) have been determined for subsequent images of the reference video, for positions of the camera 94 closer to the training scene. It is again emphasized that the reference object 93 is not visible in the training image, and that the reference objects 93 in the training image of FIG. 10 are shown for illustration purposes only, to indicate the presence, in the reference data of the training image, of a local illumination map for each position of the reference object 93 in the training image.

It should be noted that, in some cases, it might be necessary to perform additional corrections when including a local illumination map in the reference data of a training image. As discussed above, in order to be included in the reference data of a training image, a local illumination map needs to be transformed into the first coordinate system of the training image. Such a transformation corresponds to a rotation of the local illumination map, to obtain a transformed local illumination map as expected to be seen from the first camera 91 in the pose used for acquiring the training image.

However, in some embodiments, other differences may need to be taken into account.

For instance, when using a second camera 92 separate from the first camera 91, the differences between the first camera 91 and the second camera 92 may need to be calibrated and accounted for in the reference images and in the training images.

Also, when acquiring an image, a camera typically performs in a conventional manner some corrections such as white balance correction, color correction, exposure correction, etc. Even when using a same camera 94 for acquiring a reference video, the corrections (white balance, color, exposure, etc.) applied by the camera 94 may vary from one reference image to another, due to e.g. the movement of the camera 94 relative to the illuminants illuminating the training scene. In order to be able to project a local illumination map, determined based on a reference image, into another reference image used as training image, the differences in the respective corrections (white balance, color, exposure, etc.) applied for the reference image and the training image may need to be compensated in some cases. This can be done either on the reference image itself, or on the local illumination map determined based on this reference image. Hence, in some embodiments, the image processing method 50 further comprises white balance correcting and/or color correcting and/or exposure correcting the reference images (or the local illumination maps) with respect to the training image. For instance, when correcting a local illumination map that may be included in a training image, the following steps may be applied:

- canceling in the local illumination map the color correction applied when acquiring the reference image used to determine said local illumination map,
- canceling in the local illumination map the white balance correction applied when acquiring said reference image,
- applying to the local illumination map the white balance correction applied when acquiring the training image,
- applying to the local illumination map the color correction applied when acquiring the training image,
- compensating the difference between the exposure corrections applied when acquiring the reference image and the training image.

As indicated before, the machine learning model may be trained during a training phase 11 carried out by the training unit 30, via supervised learning. In such a case, the training unit 30 uses the training dataset to train the machine learning model to enable predicting, for each training image, each local illumination map included in said each training image.

In preferred embodiments, the machine learning model is configured to receive as input an image (i.e. a training image during the training phase 11 or an input image during the predicting phase 12) and a position for which the machine learning model needs to predict a local illumination map. During the training phase 11, the machine learning model therefore receives as input a training image and a transformed position $P'_n$ in the first coordinate system of said training image. The training phase 11 aims at training the machine learning model to predict the transformed local illumination map associated to said training image and said transformed position $P'_n$. The transformed position $P'_n$ is for instance a 2D position such as e.g. the coordinates of the pixel in the training image representing the transformed position $P'_n$ or, preferably, a 3D position such as e.g. the coordinates of the pixel in the training image representing the transformed position $P'_n$ and the distance between the first camera 91 when acquiring the training image and the transformed position $P'_n$.

For instance, during the training phase 11, the machine learning model is iteratively updated for each training image/transformed local illumination map (in the reference data associated to the training image) pair in order to optimize a predefined loss function, until a predefined stop criterion is satisfied. For each training image/transformed local illumination map pair, the loss function compares the local illumination map predicted by the machine learning model with the expected local illumination map, i.e. the transformed local illumination map included in the reference data of the training image and associated to the transformed position received as input. This iterative process is repeated for each training image/transformed local illumination map pair of the training dataset. Any suitable stop criterion may be used. For instance, the stop criterion is satisfied when the loss function may be considered to be sufficiently optimized and/or when the number of iterations performed reaches a predetermined maximum number of iterations, etc.

According to a non-limitative example, the loss function may comprise an evaluation of a sum of pixelwise distances between the predicted local illumination map and the transformed local illumination map associated in the reference data to the processed training image and transformed position. For instance, the distance considered may be based on a p-norm, preferably a 2-norm (a.k.a. L2 norm), between the pixels' values. The loss function may for instance be expressed as:

$$\text{loss} = \sum_{p=1}^{P} \|\widehat{LI_{map}}(p) - LI_{map}(p)\|_2^2$$

wherein:
- $\|\cdot\|_2$ is the 2-norm,
- $LI_{map}$ is the transformed local illumination map associated to the transformed position in the reference data of the training image,
- $\widehat{LI_{map}}$ is the predicted local illumination map,
- p is the index of the considered pixel in the pixelwise distance and
- P is the number of pixels in the local illumination maps.

Of course, other loss functions may be used during the training phase 11. Also, other supervised learning methods may be used to train the machine learning model to predict illumination conditions for different positions relative to a scene, and the choice of a specific supervised learning method corresponds to a specific non-limitative embodiment of the present disclosure.

For instance, the machine learning model is a neural network. In preferred embodiments, the machine learning model comprises a convolutional neural network (CNN), preferably a fully convolutional neural network (FCN).

For instance, the machine learning model includes a U-Net [Ronneberger+2015]. Such a U-Net comprises an encoder which successively down-samples an image (i.e. training image during the training phase 11 or input image during the predicting phase 12) and a decoder which successively up-samples back to the original resolution the image received from the encoder. Skip connections between the encoder and the decoder ensure that small details in the input image are not lost. For instance, the machine learning model comprises a lightweight U-net with five convolutional down-sampling layers and five corresponding convolutional up-sampling layers.

More generally speaking, any suitable architecture may be considered for the machine learning model, in particular any suitable CNN architecture, and the training dataset may be used to train any type of machine learning model suitable for image processing.

It is emphasized that the present disclosure is not limited to the above exemplary embodiments. Variants of the above exemplary embodiments are also within the scope of the present disclosure.

REFERENCES

[Garon+2019] Garon, M., Sunkavalli, K., Hadap, S., Carr, N., Lalonde, J. F.: "Fast spatially-varying indoor lighting estimation", in Proceedings of the IEEE/CVF Conference on Computer Vision and Pattern Recognition, pp. 6908-6917, 2019.

[Ronneberger+2015] Olaf Ronneberger, Philipp Fischer, and Thomas Brox: "U-Net: Convolutional Networks for Biomedical Image Segmentation", International Conference on Medical image computing and computer-assisted intervention, Springer, Cham, 2015. pp. 234-241, arXiv: 1505.04597

The invention claimed is:

1. An image processing method for generating a training dataset to train a machine learning model to predict different illumination conditions for different positions relative to a scene, said training dataset including training images and reference data, said image processing method comprising:
   obtaining a training image of a training scene, to be included in the training dataset, acquired by a first camera having a first coordinate system associated thereto;
   determining a plurality of local illumination maps, each of the local illumination maps being associated to a respective position relative to the training scene in a respective second coordinate system and representing in said respective second coordinate system the illumination received from different directions of arrival around said respective position;
   transforming the position of each of the local illumination maps from the respective second coordinate system to the first coordinate system; and
   responsive to determining that the transformed position of the respective local illumination map is visible in the training image: transforming said local illumination map from the respective second coordinate system to the first coordinate system and including the transformed local illumination map and the respective transformed position in the reference data associated to the training image to enable training the machine learning model to predict the different illumination conditions for the different positions relative to the scene.

2. The image processing method according to claim 1, wherein the determining the plurality of local illumination maps comprises:
   acquiring, by an imaging device, a reference sequence of the training scene while moving the imaging device relative to the training scene, said reference sequence comprising a plurality of reference images, said imaging device comprising a second camera configured to acquire the reference sequence and a reference object arranged in a field of view of the second camera,
   determining a pose of the second camera relative to the training scene when acquiring each of the reference images of the reference sequence, and a corresponding second coordinate system associated to the second camera,
   extracting the reference object from each of the reference images, and
   estimating the respective local illumination map for each of the reference images, based on the reference object extracted from each of the reference images.

3. The image processing method of claim 2, wherein the first camera and the second camera are a same camera, and the training image is a reference image of the reference sequence.

4. The image processing method of claim 2, wherein the first camera is included in the imaging device and is separate from the second camera, and the first camera acquires one or more training images simultaneously with the acquisition of the reference sequence by the second camera.

5. The image processing method of claim 2, wherein the pose of the second camera is estimated by a simultaneous localization and mapping (SLAM) algorithm.

6. The image processing method of claim 2, wherein the reference object is a sphere having a predetermined color.

7. The image processing method of claim 2, wherein the estimating the local illumination map based on an extracted reference object comprises iterating, until a stop criterion is satisfied:
   rendering a candidate reference object based on a candidate local illumination map,
   comparing the rendered candidate reference object with the extracted reference object, and
   updating the candidate local illumination map based on a result of the comparison of the rendered candidate reference object with the extracted reference object.

8. The image processing method of claim 2, further comprising one or more of white balance correcting, color correcting, and exposure correcting the reference images with respect to the training image.

9. The image processing method of claim 1, wherein the transforming the local illumination map further comprises one or more of white balance correcting, color correcting, and exposure correcting said local illumination map with respect to the training image.

10. The image processing method of claim 1, further comprising using the training dataset to train the machine learning model to enable predicting each of the local illumination maps associated to a training image when applied to said training image.

11. The image processing method according to claim 1, wherein the machine learning model is trained to selectively adapt rendering of illumination of a reference object based on a position of the reference object relative to the scene to generate a large training dataset.

12. An image processing system configured to generate a training dataset to train a machine learning model to predict illumination conditions for different positions relative to a scene, said training dataset including training images and reference data, said image processing system comprising:
   a dataset generator comprising at least one memory and at least one processor, said at least one processor of the dataset generating unit being configured to:
      obtain a training image of a training scene, to be included in the training dataset, acquired by a first camera having a first coordinate system associated thereto,
      determine a plurality of local illumination maps, each of the local illumination maps being associated to a respective position relative to the training scene in a respective second coordinate system and representing in said respective second coordinate system the illumination received from different directions of arrival around said respective position,
      transform the position of each of the local illumination maps from the respective second coordinate system to the first coordinate system,
      responsive to determining that the transformed position of the respective local illumination map is visible in the training image: transform said local illumination map respective second coordinate system to the first coordinate system and include the transformed local illumination map and its the respective transformed position in the reference data associated to the training image to enable training the machine learning model to predict the different illumination conditions for the different positions relative to the scene.

13. The image processing system according to claim 12, wherein the at least one processor of the dataset generating unit is further configured to determine the plurality of local illumination maps by:
  acquiring, by an imaging device, a reference sequence of the training scene while moving the imaging device relative to the training scene, said reference sequence comprising a plurality of reference images, said imaging device comprising a second camera for configured to acquire the reference sequence and a reference object arranged in a field of view of the second camera,
  determining a pose of the second camera relative to the training scene when acquiring each of the reference images of the reference sequence, and a corresponding second coordinate system associated to the second camera,
  extracting the reference object from each of the reference images, and
  estimating a local illumination map for each of the reference images, based on the reference object extracted from each of the reference images.

14. The image processing system of claim 13, wherein the first camera and the second camera are a same camera, and the training image is a reference image of the reference sequence.

15. Image processing system of claim 13, wherein the first camera is included in the imaging device and is separate from the second camera, and the first camera is configured to acquire one or more training images simultaneously with the acquisition of the reference sequence by the second camera.

16. The image processing system of claim 13, wherein the pose of the second camera is estimated by a simultaneous localization and mapping (SLAM) algorithm.

17. The image processing system of claim 13, wherein the reference object is a sphere having a predetermined color.

18. The image processing system of claim 13, wherein the at least one processor of the dataset generating unit is configured to estimate the local illumination map based on an extracted reference object by iterating, until a stop criterion is satisfied:
  rendering a candidate reference object based on a candidate local illumination map,
  comparing the rendered candidate reference object with the extracted reference object, and
  updating the candidate local illumination map based on a result of the comparison of the rendered candidate reference object with the extracted reference object.

19. The image processing system of claim 13, wherein the at least one processor of the dataset generator is further configured to one or more of white balance correct, color correct, and exposure correct the reference images with respect to the training image.

20. The image processing system of claim 12, wherein the at least one processor of the dataset generator is further configured to, when transforming the local illumination map further, one or more of white balance correct, color correct, and exposure correct said local illumination map with respect to the training image.

21. The image processing system of claim 12, further comprising a trainer comprising at least one processor configured to use the training dataset to train the machine learning model to enable predicting each of the local illumination maps associated to a training image when applied to said training image.

22. A non-transitory computer readable medium comprising computer readable code which, when executed by one or more processors, cause said one or more processors to generate a training dataset to train a machine learning model to predict illumination conditions for different positions relative to a scene, said training dataset including training images and reference data, said computer readable code causing said one or more processors to:
  obtain a training image of a training scene, to be included in the training dataset, acquired by a first camera having a first coordinate system associated thereto;
  determine a plurality of local illumination maps, each of the local illumination maps being associated to a respective position relative to the training scene in a respective second coordinate system and representing in said respective second coordinate system the illumination received from different directions of arrival around said respective position;
  transform the position of each of the local illumination maps from the respective second coordinate system to the first coordinate system;
  responsive to determining that the transformed position of the respective local illumination map is visible in the training image: transform said local illumination map from the respective second coordinate system to the first coordinate system and include the transformed local illumination map and its transformed position in the reference data associated to the training image to enable training the machine learning model to predict the different illumination conditions for the different positions relative to the scene.

* * * * *